United States Patent [19]
Yonetani

[11] Patent Number: 5,698,301
[45] Date of Patent: Dec. 16, 1997

[54] PHOSPHORESCENT ARTICLE

[75] Inventor: Takayuki Yonetani, Kobe, Japan

[73] Assignee: YKK Corporation, Tokyo, Japan

[21] Appl. No.: 534,822

[22] Filed: Sep. 27, 1995

[30] Foreign Application Priority Data

Sep. 30, 1994 [JP] Japan .................. 6-259682

[51] Int. Cl.⁶ .................. B32B 7/00; F21K 2/00
[52] U.S. Cl. .................. 428/213; 428/41.8; 428/42.1; 428/204; 428/215; 428/220; 428/332; 428/328; 428/352; 428/690; 428/913; 250/484.4; 40/542
[58] Field of Search .................. 428/690, 913, 428/40.1, 41.8, 42.1, 204, 213, 215, 328, 352, 220, 332; 40/542, 543; 250/462.1, 483.1, 484.4

[56] References Cited

U.S. PATENT DOCUMENTS

| | | |
|---|---|---|
| 3,294,699 | 12/1966 | Lange . |
| 4,663,214 | 5/1987 | Coburn, Jr. .................. 428/204 |
| 4,677,010 | 6/1987 | Selwyn .................. 428/40 |
| 4,844,990 | 7/1989 | White .................. 428/690 |
| 4,913,946 | 4/1990 | Sala et al. .................. 428/38 |
| 5,242,725 | 9/1993 | Weissmann et al. .................. 428/40 |
| 5,415,911 | 5/1995 | Zampa et al. .................. 428/40 |
| 5,432,351 | 7/1995 | Pesce, et al. .................. 250/486.1 |

FOREIGN PATENT DOCUMENTS

| | | |
|---|---|---|
| A-0094132 | 11/1983 | European Pat. Off. . |
| A-0158573 | 10/1985 | European Pat. Off. . |
| A-0622440 | 11/1994 | European Pat. Off. . |
| 52-49245 | 4/1977 | Japan . |
| 60-135246 | 7/1985 | Japan . |
| 2-3704 | 1/1990 | Japan . |
| A-1190520 | 5/1970 | United Kingdom . |

OTHER PUBLICATIONS

"The Effect of an Ultrafine Pigment Color Filters on CRT Brightness, Contrast and Color Purity", Sony Corporation, Display Device Gp. K. Ohno, T. Kusunoki and K. Ozawa, p. 7–13, date not given.

*Primary Examiner*—Marie Yamnitzky
*Attorney, Agent, or Firm*—Hill, Steadman & Simpson

[57] ABSTRACT

A phosphorescent article which has a phosphorescent layer and a transparent resin layer sequentially superposed on a reflective layer. It uses $SrAl_2O_4$ as a phosphorescent pigment to be incorporated in the phosphorescent layer and a transparent resin containing no ultraviolet light absorber is used for the transparent resin layer. Further, for the convenience of use, an adhesive layer and a release layer may be sequentially superposed on the surface of the reflective layer opposite to the surface thereof contiguous to the phosphorescent layer.

15 Claims, 1 Drawing Sheet

5,698,301

PHOSPHORESCENT ARTICLE

BACKGROUND OF THE INVENTION

1. Field of the Invention

This invention relates to a phosphorescent article and more particularly to a phosphorescent article which is capable of absorbing and accumulating light therein and, when placed in a dark place, emitting light.

2. Description of the Prior Art

Heretofore, ZnS:Cu, (Ca,Sr)S:Bi, etc. have been known as phosphorescent pigments (long afterglow phosphors) and ZnS:Cu phosphor has been widely used for luminous paints.

These phosphorescent pigments have the nature of exciting themselves by absorbing the light such as the daylight or the fluorescent light (accumulation of light) and, when placed in a dark place, emitting light. Since these phosphorescent pigments are capable of repeating the cycle of absorbing—accumulating—emitting light over and over again, they find extensive utility in various applications such as marks and signs for prevention of disasters and preservation of safety, various guide signs used in automobiles and buildings, such accessories as tie pins and pendants, dials in watches, and such fishing articles as floats and lures.

For general-purpose applications, these phosphorescent pigments are generally used in the form of phosphorescent sheets by reason of the convenience of handling.

Heretofore, the phosphorescent sheets of this class have been devised in various forms. Generally, ZnS:Cu has been used heretofore as a phosphorescent pigment for these conventional phosphorescent sheets. Japanese Patent Application, KOKAI (Early Publication) No. 52-49,245, for example, discloses a printable seal or sheet which is produced by forming on a substrate of transparent film a luminous layer incorporating a phosphorescent powder (ZnS:Cu) therein and sequentially superposing thereon an adhesive layer and a release layer with or without adhering any layer of cloth, paper, or film to the upper surface of the luminous layer.

The phosphorescent pigment ZnS:Cu which is generally used in such a conventional phosphorescent sheet as described above, however, is at a disadvantage in yielding to decomposition as by the ultraviolet light and consequently entailing gradual deterioration of the characteristics of accumulating and emitting light.

To cope with these drawbacks, Japanese Patent Publication No. 02-3,704 discloses a method which comprises sealing minute particles of the phosphorescent pigment in a protective layer made of a synthetic resin which is transparent and capable of absorbing the ultraviolet light and Japanese Patent Application, KOKAI No. 60-135,246 discloses a method which comprises coating a luminous layer containing the phosphorescent pigment with a transparent synthetic resin layer containing an ultraviolet light absorber.

Further, the light emitted by the phosphorescent pigment ZnS:Cu lacks such luminance as permits visual perception throughout the entire night. Therefore, for use in dials of luminous watches, for example, this pigment is used in with a radioactive substance so that it may be excited by the radiation of this radioactive substance and consequently enabled to emit light for a long time.

The radioactive substance, however, is at a disadvantage in being subject to strict regulations concerning the safety of handling and incurring a large cost in the disposal of waste as well.

As a phosphorescent pigment which is free from such drawbacks as have been encountered by the conventionally widely used phosphorescent pigment ZnS:Cu, a $SrAl_2O_4$ phosphor has been recently developed (the 248th Lecture of Fluorophor Society held on Nov. 26, 1993 at Physical Properties Research Institute, Tokyo University).

The phosphorescent pigment $SrAl_2O_4$ possesses excellent basic properties as a phosphorescent pigment. For instance, it enjoys outstanding qualities as exhibiting an emission spectrum (peak wavelength 520 nm) which approximates the spectrum of human visibility and exhibiting a broad excitation spectrum with high excitation efficiency to the ultraviolet light in the short wavelength region. Further, it manifests an extremely high afterglow luminance about five to ten times or more as high as the conventionally widely used ZnS:Cu and shows gradual attenuation of afterglow.

The phosphorescent pigment $SrAl_2O_4$ is nevertheless at a disadvantage in requiring a considerably long time for excitation to attain saturation of afterglow luminance as compared with the conventional pigment of ZnS:Cu. Further, since $SrAl_2O_4$ is vulnerable to water and moisture, the lamination which uses this pigment demands payment of due consideration to water resistance.

SUMMARY OF THE INVENTION

An object of the present invention, therefore, is to provide a phosphorescent article which makes effective use of the aforementioned outstanding characteristics manifested by $SrAl_2O_4$ as a phosphorescent pigment, eliminates the drawbacks thereof to the fullest possible extent, attains quick excitation, and produces lasting afterglow at high luminance.

Another object of the present invention is to provide a phosphorescent article which excels in lightfastness, water resistance, and heat resistance in addition to the phosphorescence properties mentioned above and, at the same time, possesses the shape of a sheet convenient to use.

To accomplish the objects described above, in accordance with the present invention, there is provided a phosphorescent article having a phosphorescent layer and a transparent resin layer sequentially superposed on a reflective layer, the phosphorescent layer having $SrAl_2O_4$ as a phosphorescent pigment incorporated therein, and the transparent resin layer being made of a transparent resin containing no ultraviolet light absorber.

In accordance with a preferred embodiment of the present invention, there is provided a phosphorescent sheet, namely a phosphorescent article formed for the sake of the convenience of use in the form of a self-adhesive sheet, which has an adhesive layer and a release layer sequentially superposed on the surface of the aforementioned reflective layer opposite to the surface thereof contiguous to the phosphorescent layer.

BRIEF DESCRIPTION OF THE DRAWINGS

Other objects, features, and advantages of the invention will become apparent from the following description taken together with the drawings, in which.

DETAILED DESCRIPTION OF THE INVENTION

Figure 1:
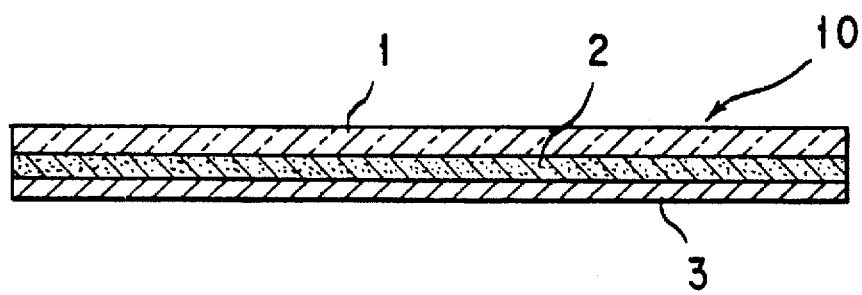
FIG. 1 is a cross sectional view showing the fundamental stratal construction of a phosphorescent article of the present invention.

The phosphorescent pigment $SrAl_2O_4$ which is used in the present invention, as described above, possesses such excellent qualities as producing extremely high luminance and possessing a long afterglow time, that is to say, continuing the emission of light for a long time when it emits light in a dark place after absorption and accumulation of light (excitation). It nevertheless is at a disadvantage in requiring a considerably long time for excitation as compared with the conventionally popularly used phosphorescent pigment ZnS:Cu and being deficient in water resistance.

The phosphorescent article according to the present invention, therefore, protects the phosphorescent layer deficient in water resistance against moisture and water by disposing the transparent resin layer containing no ultraviolet light absorber on the obverse surface of the phosphorescent layer containing the phosphorescent pigment $SrAl_2O_4$ and the reflective layer on the reverse surface thereof and, at the same time, enables the incident light to be passed through the transparent resin layer thoroughly and absorbed in the phosphorescent layer by keeping the surface-protecting transparent resin layer from containing an ultraviolet light absorber and moreover enables the light which has once escaped being absorbed to be reflected by the reflective layer on the reverse surface and absorbed again by the phosphorescent layer and, as a result, enables the applied light to be absorbed efficiently by the phosphorescent layer and shortens the time of excitation.

Owing to the adoption of the stratal construction described above, the phosphorescent article of the present invention acquires quick excitation and manifests an outstanding function and effect of emitting light at high luminance for a long time.

Now, the present invention will be described more specifically below with reference to embodiments illustrated in the drawings and a working example.

FIG. 1 shows the fundamental stratal construction of a phosphorescent article 10 of the present invention. In FIG. 1, the numeral 1 stands for a transparent resin layer, 2 for a phosphorescent layer, and 3 for a reflective layer.

Unlike the conventional protective layer, the transparent resin layer 1 ought to use a transparent resin containing no ultraviolet light absorber. The phosphorescent pigment $SrAl_2 O_4$ which is contained in the phosphorescent layer 2, unlike the conventionally popularly used pigment ZnS:Cu, is deteriorated only sparingly by the ultraviolet light and is excited by the ultraviolet light (200 to 450 nm). By heightening the ultraviolet transmittance of the transparent resin layer 1, therefore, the phosphorescence property of the phosphorescent layer 2 is improved. The transparent resin layer 1, when it is deficient in transparency, has poor light transmittance and inevitably obstructs the emission of light by the phosphorescent layer.

Further, the major factor for the deterioration of the phosphorescent pigment $SrAl_2O_4$ resides in the action of water and moisture. In regard to the function of the transparent resin layer 1 as a protective film, therefore, it is thought necessary to select a resin excellent in water resistance for the transparent resin layer 1. When the phosphorescent article is to be used in an automobile, for example, since the interior of the automobile possibly reaches a temperature exceeding 80° C. in the summer season, this phosphorescent article at times is required to use a resin which is resistant to heat.

As the material for the transparent resin layer 1, a resin adapted for particular use may be selected in due consideration of such various factors as mentioned above. As concrete examples of the material, polycarbonates, acrylic resins, polyvinyl chlorides, and polyesters may be cited.

The phosphorescent layer 2 is a layer which contains the phosphorescent pigment $SrAl_2O_4$ possessing the nature of being by absorbing such light as the daylight or the fluorescent light (accumulation of light) and, when placed in a dark place, emitting light. It constitutes a main layer of the phosphorescent article 10.

The formation of the phosphorescent layer 2 is effected by dispersing a phosphorescent pigment composed mainly of $SrAl_2O_4$, for-example, in a varnish prepared by dissolving a resin in a solvent thereby preparing an ink and printing or applying this ink on a surface of a substrate (transparent resin layer 1 or reflective layer 3) by a suitable means such as, for example, a silk screen printing. The content of $SrAl_2O_4$ in the phosphorescent layer may be so set that it may fall in the range of from 70 to 85% by weight in the eventually formed film. If the content is less than 70% by weight, the light which is emitted will be deficient in luminance. Conversely, if the content exceeds 85% by weight, the incorporation of the phosphorescent pigment into the varnish during the preparation of the ink will be attained with difficulty. Generally, in consideration of the loss of weight by drying (as by volatilization of the solvent) after the formation of the film, the content of $SrAl_2O_4$ in the ink is proper in the approximate range of from 40 to 60% by weight.

Examples of the resins used for preparing the varnish may include the resins enumerated above as to be used for the transparent resin layer. The preferred resin for the varnish is an acrylic resin, a vinyl chloride-acrylic resin (copolymer), or the like in consideration of the necessity of resistance to heat. The printing is attained advantageously by the silk screen processing. The reflective layer 3 is a layer intended for improving the luminance of the phosphorescent layer 2 which emits light. It is disposed on the reverse surface of the phosphorescent layer 2 and adapted to fulfil the function of reflecting the light which has escaped being absorbed by the phosphorescent layer and enabling the reflected light to be absorbed by the phosphorescent layer and the function of protecting the phosphorescent layer 2 against moisture and water as well.

The formation of the reflective layer 3 is attained by preparing a sheet, ink, or coating material containing a white pigment such as, for example, titanium oxide (titanium white) and superposing it on the reverse surface of the phosphorescent layer by adhering, printing, or applying. In a preferred embodiment, it is advantageous that the pigments added to the phosphorescent layer 2 and the reflective layer 3 be different and other components added thereto be identical to ensure intimate and fast adhesion between the phosphorescent layer and the reflective layer.

The total thickness of the transparent resin layer 1, the phosphorescent layer 2, and the reflective layer 3 mentioned above is proper in the range of from 70 to 600 µm, preferably from 160 to 600 µm. If the total thickness is less than 70 µm, the phosphorescent layer will be too thin to obtain easily the phosphorescent article which attains quick excitation, high luminance, and long afterglow as expected by the present invention and the transparent resin layer will be likewise unduly thin for the purpose of providing fully satisfactory protection for the phosphorescent layer. Thus, any deviation of the total thickness from the range mentioned above proves disadvantageous.

The sheet or laminate having a total thickness of not less than 160 µm possesses such proper flexibility that it will enjoy the advantage of not readily sustaining breakage as when it is adhesively bonded to a surface of an object or not easily gathering wrinkles after the adhesive bonding. This total thickness allows the phosphorescent layer to acquire a sufficient thickness and, therefore, promises impartation to the phosphorescent article a sufficient phosphorescence property as expected. Since it further permits the transparent resin layer to acquire an ample thickness, the transparent resin layer provides thorough protection for the phosphorescent layer and exhibits high water resistance and heat resistance. Thus, the sheet can be advantageously utilized as an adhesive sheet as in an automobile.

If the total thickness exceeds 600 µm, however, the sheet will be unduly thick and rigid and will fail to retain flexibility and, as a result, will suffer from the disadvantage of not easily adhering to a curved surface and readily causing separation from the surface after the adhesion. Further, this sheet will readily sustain a crack or fracture when it is formed in a suitable shape by cutting.

When the total thickness of the transparent resin layer, the phosphorescent layer, and the reflective layer is in the range of from 160 to 600 µm, the sheet composed of these layers is neither too thin nor too thick but has a suitable thickness and enjoys the advantage that it will be easily cut. The phosphorescent laminate is sorted as a seal when the total thickness is in the range of from 70 to 160 µm and as a sheet when the total thickness is in the range of from 160 to 600 µm. This classification is for the sake of convenience and constitutes no essential requirement for the phosphorescent article contemplated by the present invention. The term "sheet" as used in the present specification should be construed in a broad sense inclusive of seal.

Now, the thicknesses of the component layers of the laminate will be described. First, the thickness of the transparent resin layer 1 is proper in the range of from 10 to 400 µm, preferably from 100 to 400 µm. If this thickness is less than 10 µm, the transparent resin layer will not satisfactorily function as a protective layer and will be readily susceptible to external influences (the action of water, heat, etc.) because of unduly small thickness. The transparent resin layer 1, when exposed to an external influence, will encounter difficulty in enabling the phosphorescent layer to retain its phosphorescence property. Thus, the objects of the present invention will not be easily accomplished.

If the thickness of the transparent resin layer is not less than 100 µm, the sheet will acquire flexibility enough to avoid sustaining such damages as breakage and wrinkle when applied to a surface of an object by adhesion, protect the phosphorescent layer against damage as by bending, and manifest an excellent protective function for the sake of coping with external influences. If the thickness of the transparent resin layer exceeds 400 µm, however, the sheet will become so rigid as to diminish its flexibility and suffer from the disadvantage of encountering difficulty in adhering to a curved surface or the like, readily peeling off the surface after the adhesion, and easily sustaining a crack or fracture while being cut. This excessive thickness is further at a disadvantage in being liable to degrade the luminance of the light to be emitted by the phosphorescent layer.

The thickness of the phosphorescent layer 2 is proper in the range of from 50 to 200 µm. If this thickness is less than 50 µm, the phosphorescent article of the present invention will not sufficiently manifest the expected effects, namely quick excitation, high luminance, and long afterglow.

The luminance and the afterglow time increase in proportion as this thickness increases. If the thickness exceeds 200 µm, however, the excess will prove uneconomical because it will bring about no proportionate improvement in such characteristics as quickness of excitation, luminance, or afterglow property.

Finally, the thickness of the reflective layer 3 is desired to be not less than 10 µm. If it is less than 10 µm, the reflective layer 3 will be at a disadvantage in suffering from partial transmission of light therethrough, failing to attain the effect of reflecting light as the main object of the reflective layer, and rendering quick excitation difficult.

Incidentally, the thickness of the reflective layer is only required to be in the range in which the reflective layer manifests the effect of reflecting light as expected. No upper limit is particularly set to this thickness. It may be properly set to suit a particular use in consideration of such problems as poor adhesion to a curved surface and occurrence of a crack during the formation of sheet by cutting as mentioned above.

Figure 2:
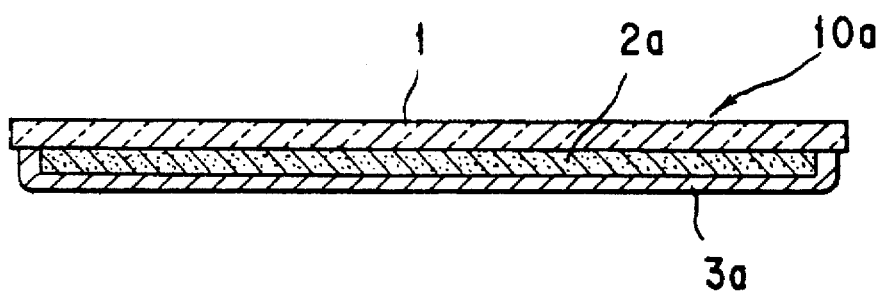
FIG. 2 is a cross sectional view showing one example of the modification of the phosphorescent article shown in FIG. 1.

FIG. 2 shows one example of the modification of the fundamental stratal construction of the phosphorescent article shown in FIG. 1.

In a phosphorescent article 10a shown in FIG. 2, the phosphorescent layer 2a is completely covered with the reflective layer 3a and tightly sealed between the reflective layer 3a and the transparent resin layer 1. By this construction, the phosphorescent layer 2a can be completely shielded from moisture and water and the water resistance of the phosphorescent article 10a can be further improved.

Figure 3:
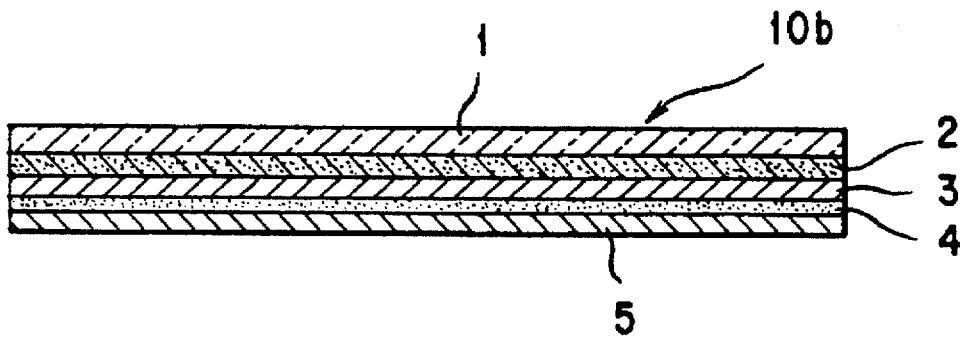
FIG. 3 is a cross sectional view showing the stratal construction of another example of the phosphorescent article of the present invention.

FIG. 3 shows a phosphorescent article 10b formed in the form of a self-adhesive sheet for the sake of the convenience in use, namely a so-called phosphorescent sheet or label produced by sequentially superposing an adhesive layer 4 and a release layer 5 on the reverse surface of the reflective layer 3. In the rest of the construction, this phosphorescent article 10b is identical with the phosphorescent article shown in FIG. 1.

When the phosphorescent article 10b is intended to be used under conditions of relatively high temperatures such as in the interior of an automobile, a pressure sensitive adhesive agent excelling in heat resistance (such as, for example, a product of Nitto Electric Industrial Co., Ltd. marketed under product code of "500") ought to be selected and used for the adhesive layer 4. The release layer may be any of various well known and commercially available release papers. Since the phosphorescent article of the present invention uses $SrAl_2 O_4$ as a phosphorescent pigment and adopts a stratal construction having a transparent resin layer not containing an ultraviolet light absorber disposed on the obverse surface of a phosphorescent layer containing $SrAl_2 O_4$ and a reflective layer disposed on the reverse surface thereof as described above, it protects the phosphorescent layer deficient in water resistance against moisture and water and enables it to manifest the phosphorescence effect fully and, at the same time, allows the phosphorescent layer to absorb efficiently the incident light, effects quick excitation, and produces the afterglow at high luminance for a long time. It, therefore, can repeat efficiently and infallibly the cycle of absorption—accumulation (excitation)—emission of light and can be used advantageously in a wide range of applications which require emission of light in a dark place. When the so-called phosphorescent sheet is formed by sequentially superposing an adhesive layer and a release layer on the reverse surface of the reflective layer, it enjoys convenience of use because it can be easily adhered to the surface of a given support (a finished product or a part) by simple separation of the release layer.

Further, since $SrAl_2O_4$ is used as the phosphorescent pigment, the produced phosphorescent article is deteriorated only sparingly by the ultraviolet light and, therefore, can be used outdoors with improved durability. Since this phosphorescent article contains no radioactive substance, it avoids exerting any adverse effect on human body and has no restriction on the largeness of the phosphorescent surface.

Now, a working example embodying the present invention will be described below.

Example:

On a transparent resin sheet of polycarbonate 300 μm in thickness, an ink prepared by kneading a varnish having vinyl chloride-acrylic resin dissolved in butyl cellosolve with 50% by weight of $SrAl_2O_4$ was applied by a silk screen processing in varying ultimate thicknesses (50 to 200 μm) and then dried to form a phosphorescent layer.

Then, on the phosphorescent layer formed as described above, an ink prepared by kneading the same varnish having vinyl chloride-acrylic resin in butyl cellosolve with 21% by weight of titanium oxide was applied and dried to form a reflective layer 14 μm in thickness. Subsequently, on the reflective layer thus formed, a pressure sensitive adhesive (produced by Toyo Ink Mfg. Co., Ltd. and marketed under product code of "DF2700 M12-X") was applied and a release paper was adhered thereto to obtain a phosphorescent sheet having a stratal construction shown in FIG. 3.

The phosphorescent sheets obtained as described above invariably showed very high luminance of emitted light and produced very long afterglow times. They produced fairly quick excitation as compared with phosphorescent sheets which excluded a reflective layer.

While certain specific embodiments and a working example have been disclosed herein, the invention may be embodied in other specific forms without departing from the spirit or essential characteristics thereof. The described embodiments and example are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

What is claimed is:

1. A phosphorescent article comprising:
    a reflective layer comprising a white pigment,
    a phosphorescent layer superposed on said reflective layer comprising from about 70 to about 85% by weight, based on the weight of said phosphorescent layer, of $SrAl_2O_4$ as a phosphorescent pigment,
    and a transparent resin layer superposed on said phosphorescent layer, said transparent resin layer comprising a transparent resin and containing no ultraviolet light absorber, the total thickness of said reflective layer, phosphorescent layer and transparent resin layer being in the range of from about 70 to about 600 μm, the thickness of said reflective layer being not less than 10 μm, the thickness of said phosphorescent layer being in the range of from about 50 to about 200 μm, and the thickness of said transparent resin layer being in the range of from about 10 to about 400 μm.

2. A phosphorescent article as defined in claim 1, wherein the thickness of said transparent resin layer is in the range of from about 100 to about 400 μm.

3. A phosphorescent article as defined in claim 1, wherein said phosphorescent layer further comprises a synthetic resin.

4. A phosphorescent article as defined in claim 3, wherein said reflective layer further comprises a synthetic resin, said synthetic resin being identical with the synthetic resin in said phosphorescent layer.

5. A phosphorescent article as defined in claim 3, wherein said synthetic resin is selected from the group consisting of acrylic resins, polyvinyl chloride resins, vinyl chloride-acrylic resins and mixtures of any of the foregoing resins.

6. A phosphorescent article as defined in claim 1, wherein said reflective layer further comprises a synthetic resin.

7. A phosphorescent article as defined in claim 6, wherein said synthetic resin is selected from the group consisting of acrylic resins, polyvinyl chloride resins, vinyl chloride-acrylic resins and mixtures of any of the foregoing resins.

8. A phosphorescent article as defined in claim 1, wherein said phosphorescent layer is completely covered with said reflective layer and is sealed between said reflective layer and said transparent resin layer.

9. A phosphorescent article as defined in claim 1, which further comprises an adhesive layer and a release layer sequentially superposed on the surface of said reflective layer opposite said phosphorescent layer.

10. A phosphorescent article as defined in claim 1, wherein said transparent resin is selected from the group consisting of polycarbonate resins, acrylic resins, polyvinyl chloride resins and polyester resins.

11. A phosphorescent article as defined in claim 1, wherein said white pigment is titanium white.

12. A phosphorescent sheet comprising;
    a release sheet, an adhesive layer superposed on said release sheet,
    a reflective layer comprising a synthetic resin and a white pigment adhered to said adhesive layer,
    a phosphorescent layer superposed on said reflective layer comprising a synthetic resin and from about 70 to about 85% by weight, based on the weight of said phosphorescent layer, of $SrAl_2O_4$ as a phosphorescent pigment,
    and a transparent resin layer superposed on said phosphorescent layer, said transparent resin layer comprising a transparent resin and containing no ultraviolet light absorber,
    and the total thickness of said reflective layer, phosphorescent layer and transparent resin layer being in the range of from about 70 to about 600 μm, the thickness of said reflective layer being not less than 10 μm, the thickness of said phosphorescent layer being in the range of from about 50 to about 200 μm, and the thickness of said transparent resin layer being in the range of from about 10 to about 400 μm.

13. A phosphorescent sheet as defined in claim 12, wherein said transparent resin is selected from the group consisting of polycarbonate resins, acrylic resins, polyvinyl chloride resins and polyester resins.

14. A phosphorescent sheet as defined in claim 12, wherein said synthetic resin of said reflective layer and of said phosphorescent layer is the same and is selected from the group consisting of acrylic resins, polyvinyl chloride resins, vinyl chloride-acrylic resins and mixtures of any of the foregoing resins.

15. A phosphorescent sheet as defined in claim 12, wherein said white pigment is titanium white.

\* \* \* \* \*